UNITED STATES PATENT OFFICE.

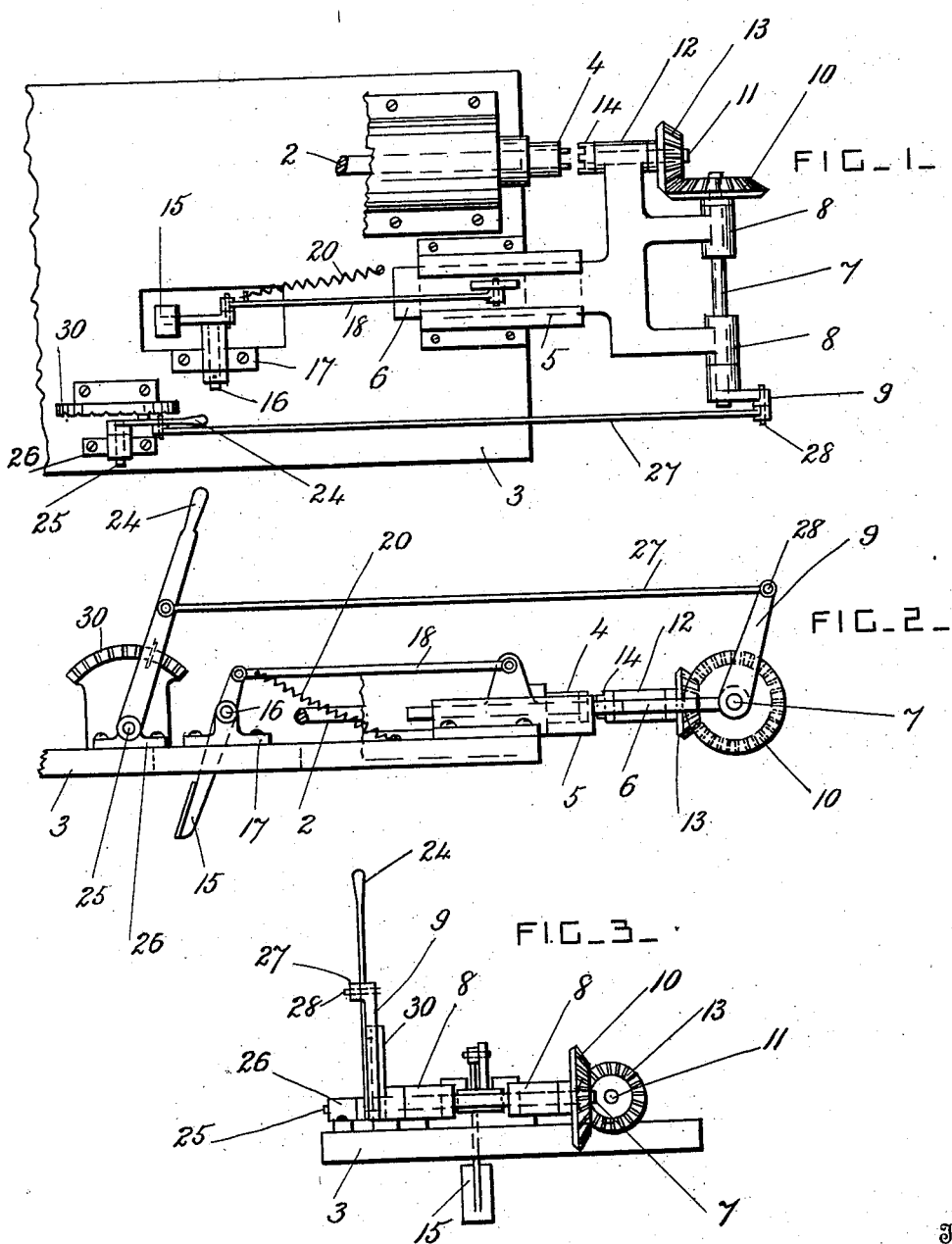

JOHN S. LAUFMAN, OF WESTERN, NEBRASKA.

STARTING MECHANISM.

1,023,944.  Specification of Letters Patent.  Patented Apr. 23, 1912.

Application filed October 18, 1911. Serial No. 655,406.

*To all whom it may concern:*

Be it known that I, JOHN S. LAUFMAN, a citizen of the United States, residing at Western, in the county of Saline and State of Nebraska, have invented certain new and useful Improvements in Starting Mechanism; and I do hereby declare the following to be a full, clear, and exact description of the invention, such as will enable others skilled in the art to which it appertains to make and use the same.

This invention relates to starting mechanism for the internal combustion engines used on automobiles; and it consists in the novel construction and combination of the parts hereinafter fully described and claimed, whereby the engine can be started without getting out of the automobile.

In the drawings, Figure 1 is a plan view of a starting mechanism constructed according to this invention. Fig. 2 is a side view; and Fig. 3 is an end view, of the starting mechanism.

The engine for driving the automobile is provided with a crankshaft 2, and it is secured on a suitable supporting frame 3. A clutch member 4 is secured on one end of the crankshaft 2, and a guide bracket or frame 5 is secured to the main frame 3. A slide 6 is arranged to slide back and forth in the guide 5 parallel to the engine crankshaft, and the operating shaft 7 of the starting mechanism is journaled in bearings 8 secured to the slide 6. A crank-arm 9 is secured on one end portion of the shaft 7, and a beveled toothed wheel 10 is secured on its other end portion.

A short intermediate clutch shaft 11 is journaled in a bearing 12 which is also secured to the slide 6, and 13 is a beveled toothed pinion secured on one end portion of the shaft 11, and arranged in gear with the wheel 10. A clutch member 14 is secured on the other end of the shaft 11 from the pinion 13 opposite the clutch member 4, the intermediate clutch shaft being arranged axially in line with the main crankshaft 2.

A foot-lever or pedal 15 is pivoted by a pin 16 to a bracket 17 on the main frame 3, and 18 is a rod which is pivoted at one end to the foot-lever, and at the other end to the slide 6. A spring 20 is provided and is secured to the rod 18 and to the main frame, so that it operates to move the slide automatically in a direction to uncouple the clutch members.

A hand-lever 24 is pivoted by a pin 25 to a bracket 26 secured to the main frame, and 27 is a connecting-rod which is pivoted at one end to the crank-arm 9 by a pin 28. The other end of the connecting-rod is pivotally connected to the hand lever in any approved manner, and the hand-lever is arranged in convenient proximity to the driver's seat in the automobile. A notched catch bracket 30 is secured to the main frame on one side of the operating lever, and the said lever is formed of resilient metal so that it may be sprung into and out of engagement with the notches of the bracket 30.

In order to start the engine, the driver first operates the foot-lever, and thereby places the clutch members in engagement with each other, and then operates the hand lever so as to revolve the main crankshaft by means of the shafts 7 and 11 and the beveled toothed wheels. When the slide is moved inward by the foot-lever the clutch member 14 is revolved slightly so that it never fails to engage with the clutch member.

What I claim is:

The combination, with a main frame, and an engine shaft mounted thereon and provided with a clutch member at one end; of a guide secured to the main frame, a slide movable in the guide parallel to the engine shaft, a clutch shaft carried by the said slide and arranged in line with the said engine shaft and having a clutch member secured on it, means for sliding the slide to place the said clutch members in engagement, a spring for retracting the slide to separate the clutch members, a hand-lever pivoted to the main frame and provided with a retaining catch, a cross-shaft journaled on the said slide, a crank-arm secured on the said cross-shaft, beveled toothed wheels connecting the said cross-shaft and clutch shaft, and a connecting-rod between the said crank-arm and hand-lever.

In testimony whereof I have affixed my signature in the presence of two witnesses.

JOHN S. LAUFMAN.

Witnesses:
  GEO. F. SAWYER,
  J. G. SAWYER.

Copies of this patent may be obtained for five cents each, by addressing the "Commissioner of Patents Washington, D. C."